April 5, 1966 R. E. BUCK 3,244,430
CHUCK CONSTRUCTION FOR ELONGATED CONTOURED WORKPIECES
Filed March 30, 1964 2 Sheets-Sheet 1

INVENTOR.
RUSSELL E. BUCK
BY
Woodhams, Blanchard and Flynn
ATTORNEYS

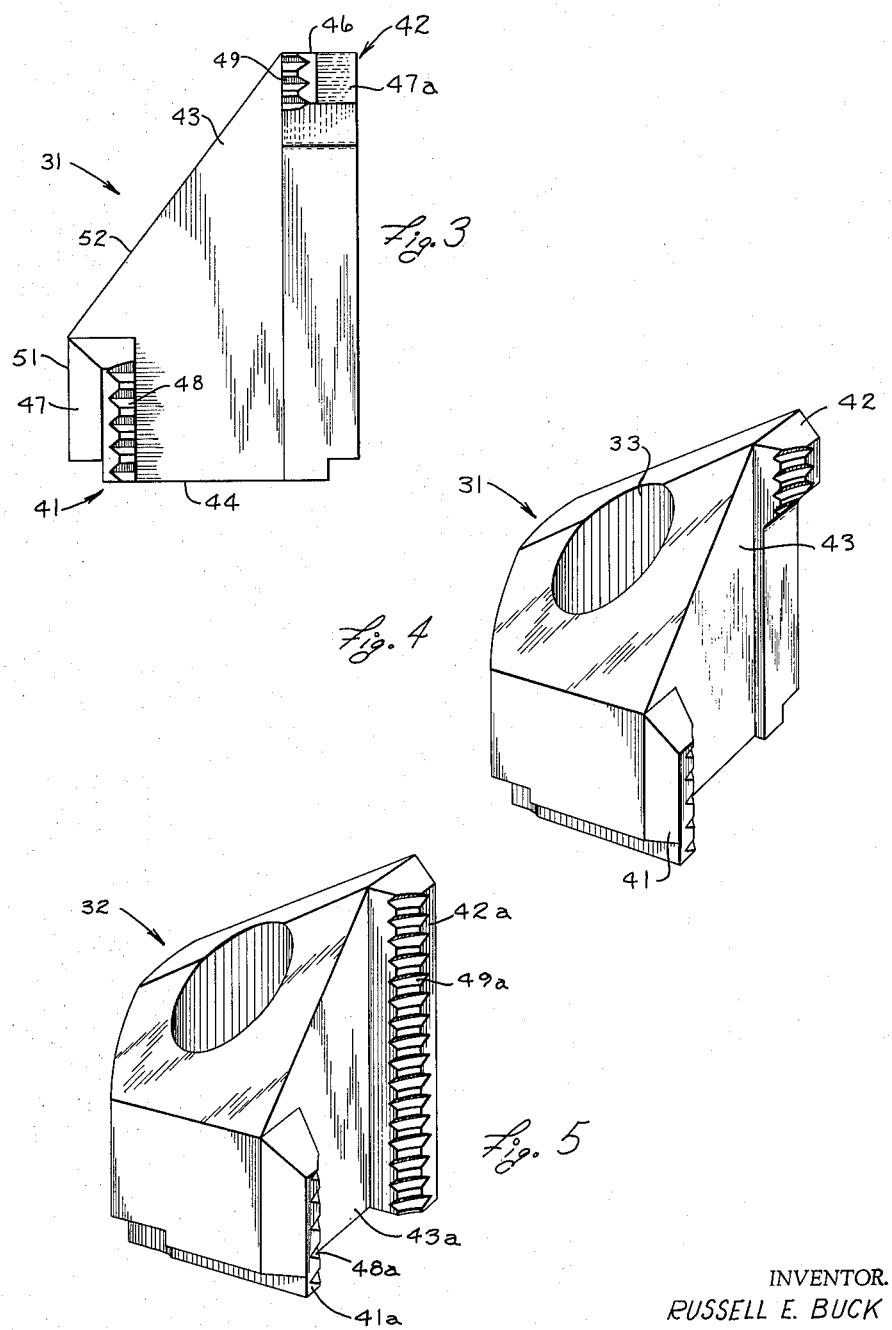

United States Patent Office 3,244,430
Patented Apr. 5, 1966

3,244,430
CHUCK CONSTRUCTION FOR ELONGATED CONTOURED WORKPIECES
Russell E. Buck, Scotts, Mich., assignor to Buck Tool Company, Kalamazoo, Mich., a corporation of Michigan
Filed Mar. 30, 1964, Ser. No. 355,574
9 Claims. (Cl. 279—121)

This invention relates to a chuck construction including a plurality of pivotally mounted jaws and, more particularly, relates to a chuck construction having pivotally mounted jaws each capable of contact with a workpiece at two axially and circumferentially spaced locations for supporting the workpiece over a substantial axial length thereof.

The chuck construction embodying the invention was developed for use with axially elongated workpieces including circularly cylindrical workpieces as well as others of widely differing configurations. These configurations include tapered, stepped or otherwise axially contoured pieces and those of noncircular cross section due, for example, to surface irregularities. Such workpieces are exemplified by castings having a rough surface texture and/or having gross irregularities resulting from sprue openings or imperfections in the mold. A particular workpiece of the type described may require one or more machining operations thereon which require chucking thereof including drilling of pilot holes for lathe centers, rough boring of axial holes and recesses in a radial face of the workpiece or turning of various surfaces thereon.

The fixed jaws of conventional chucks are generally relatively short axially and so cannot support an elongated workpiece throughout an appreciable portion of its length. As a result, forces exerted on the workpiece by a tool at a location spaced from the chuck tend to bend said workpiece or to cock it with respect to the chuck axis. Axial extension of such fixed jaws generally does not provide for effective support of elongated workpieces. Even when the workpiece is a circular cylinder, normal chuck manufacturing tolerances and wear will generally allow the jaws to rock slightly when engaging the workpiece so that the extended end thereof is less firmly gripped than the end thereof adjacent the chuck. In the same manner, the extended end of the workpiece may tend to move off axis in response to uneven gripping forces exerted thereon by the chuck jaws. Axially extended fixed jaws are even more obviously unsuited for gripping a workpiece which is not a circular cylinder. Such fixed jaws are capable of gripping only the largest diameter portion of an axially contoured or tapered workpiece and so cannot give support at axially spaced points on the workpiece.

The prior art has recognized that workpieces having circumferential irregularities may be more firmly gripped by pivotally mounted jaws. Such pivotally mounted jaws usually have a pair of circumferentially spaced gripping edges or surfaces for contacting the workpiece. A three-jaw chuck, for example, would have six such edges contacting the workpiece.

However, there has not been, to my knowledge, a chuck incorporating pivotally mounted jaws which is capable of firmly supporting axially elongated workpieces and particularly axially elongated workpieces which deviate from a cylindrical form. Moreover, no previous chuck is known to me which is capable of firmly supporting axially elongated, noncircular, cylindrical workpieces of a variety of sizes and shapes without modification of the chuck or jaws.

Hence, the objects of this invention include:
(1) To provide a chuck construction capable of firmly supporting an axially elongated workpiece for rotation therewith.

(2) To provide a chuck construction, as aforesaid, capable of firmly supporting an elongated workpiece which is noncylindrical and/or of noncircular cross section.

(3) To provide a chuck construction, as aforesaid, of the power operated or universal type incorporating a plurality of jaws pivotally mounted for movement about axes parallel to the rotational axis of a chuck.

(4) To provide a chuck construction, as aforesaid, including a plurality of evenly spaced jaws which are elongated axially of said chuck, said jaws each having a pair of circumferentially spaced, axially extending, workpiece-engaging surfaces.

(5) To provide a chuck construction, as aforesaid, wherein one of said jaws has workpiece-engaging surfaces circumferentially opposed to each other and wherein the rest of said jaws have workpiece-engaging surfaces axially spaced from each other.

(6) To provide a chuck construction, as aforesaid, in which said pair of work-engaging surfaces of each jaw are located at different distances from the pivot axis of said jaw.

(7) To provide a chuck construction, as aforesaid, which is of simple construction and is readily manufacturable of easily made or widely available components at relatively low cost in either large or limited numbers.

(8) To provide a chuck construction, as aforesaid, capable of a long service life with little or no maintenance and which is easily maintained and used by relatively inexperienced personnel.

Other objects and purposes of this invention will become apparent to persons acquainted with apparatus of this general type upon reading the following specification and inspecting the accompanying drawings.

In the drawings:
FIGURE 1 is a front elevational view of a chuck embodying the invention.
FIGURE 2 is a partially broken sectional view essentially taken on the line II—II of FIGURE 1.
FIGURE 3 is a sectional view taken on the line III—III of FIGURE 1.
FIGURE 4 is a perspective view of one of the chuck jaws of the chuck of FIGURE 1.
FIGURE 5 is a perspective view of another jaw of the chuck of FIGURE 1.

Certain terminology will be used in the following description for convenience in reference only and will not be limiting. The terms "upwardly," "downwardly," "rightwardly" and "leftwardly" will delineate directions in the drawings to which reference is made. The words "front" and "rear" will refer, respectively, to the direction in which the surface of the chuck shown in FIGURE 1 faces and to the opposite direction. The words "inwardly" and "outwardly" will refer to directions toward and away from, respectively, the geometric center of the chuck and designated parts thereof. Such terminology will include the words above specifically mentioned, derivatives thereof and words of similar import.

*General description*

In general, the objects and purposes of the invention are met by providing a chuck construction of the universal or power-operated type for gripping axially elongated workpieces and particularly adapted for firmly supporting such workpieces having a roughly textured surface or contoured configuration. The chuck includes a plurality of chuck jaws each pivotally mounted on a movable jaw carrier and each jaw has a pair of circumferentially spaced, axially extending, work-engaging faces for contacting the workpiece. The work-engaging surfaces are short with respect to the axial length of the jaw and are axially spaced from each other. The pivoted mounting of the jaws allows the work-engaging faces thereof to firmly contact the workpiece regardless of the shape and the texture thereof. In a preferred embodiment of the invention the work-engaging surfaces of one of the jaws are circumferentially opposed rather than being axially displaced as above described.

Detailed description

Figure 1:
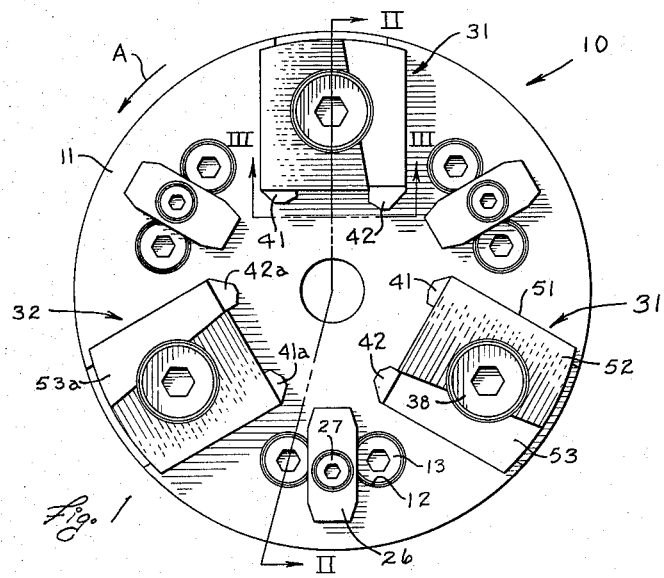
Figure 2:
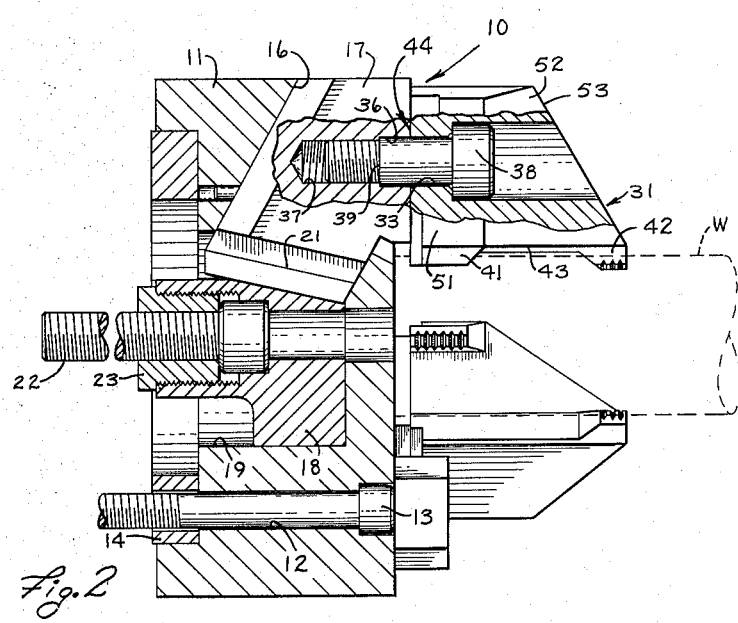

Referring now to the drawings, FIGURE 1 discloses a chuck 10 embodying the invention which may be a conventional power or universal chuck of any desired type. The particular embodiment shown for purposes of illustration is similar to the chuck of my copending application Serial No. 332,656. The chuck 10 includes a generally cylindrical chuck body 11 (FIGURES 1 and 2) having a plurality of axial, circumferentially spaced bolt holes 12 for receiving bolts 13 by means of which said chuck may be mounted on any convenient lathe face plate (not shown) or the like. An adapter ring 14 may be provided for piloting the chuck 10 on such a lathe face. The chuck 10 includes a plurality, here three, of radially inwardly and rearwardly sloped carrier ways 16 for slideably guiding jaw carriers 17. A substantially cylindrical drive member 18 is axially slideably disposed in a central recess 19 of the chuck body 11 and is slideably keyed at 21 to the radially inner ends of the jaw carriers 17 for moving said jaw carriers 17 along the ways 16. A drawbar bolt 22 and collar 23 connects the drive member 18 to a drawbar (not shown). Riser blocks 26 are affixed to the front face of the chuck 10 by screws 27 between the jaw carriers 17 to form an axial abutment. The workpiece W is indicated in broken lines in FIGURE 2. The above-described construction is known in the art and is disclosed as an example of an environment for the invention of this application.

Turning now to the structure directly involving the invention, each of the jaw carriers 17 pivotally supports a jaw, such as the jaws indicated at 31 and 32, for pivotal movement about an axis parallel to and spaced from the rotational axis of the chuck 10. Each of the jaws 31 and 32 has a countersunk cylindrical opening 33 therethrough for defining the pivot axis thereof and parallel to the rotation axis of the chuck 10. Each jaw carrier 17 has an axially extended cylindrical recess 36 coaxial with the opening 33 and of preferably identical diameter. A blind, threaded opening 37 coaxial with the recess 36 is of lesser diameter and extends rearwardly therefrom. A shoulder bolt 38 lies with a clearance fit within the opening 33 and recess 36 and threadably engages the threaded opening 37. A rearwardly facing shoulder 39 on said bolt 38 engages the forward face of the recess 36 to locate said shoulder bolt 38 so that the head thereof maintains said jaw snugly but pivotally bearing against the jaw carrier 17. Thus, each of the jaws 31 and 32 is freely pivotable about the axis of the bolt 38 but is restrained against translation with respect to the jaw carrier 17.

Each of the jaws 31 comprise an essentially rectangular block having a pair of axially aligned abutments 41 and 42 extending out of the radially inner face 43 thereof. The abutments 41 and 42 are circumferentially spaced and preferably located at the circumferential edges of the face 43. The leftward (FIGURE 3) abutment 41 extends forwardly from the rearward or carrier contact surface 44 of the jaw 31 a short distance along the face 43 and the abutment 42 extends axially from the forward end 46 of the jaw 31 a short distance rearwardly along the face 43 to a location axially spaced from the abutment 41. The circumferentially outer corners of the abutments 41 and 42 are preferably chamfered as indicated at 47 and 47a. The circumferentially inner corners of the abutments 41 and 42 are preferably concavely radiused and toothed as indicated, respectively, at 48 and 49 to assist gripping of the workpiece W thereby.

In the particular embodiment shown, the abutment 42 extends further from the face 43 than does the abutment 41. As a result, the tooth surfaces 48 and 49 are positioned at, respectively, lesser and greater distances from the face 43. The chuck 10 embodying the invention is intended for rotation in a counterclockwise direction as indicated by the arrow A in FIGURE 1. Thus, the abutment 41 leads the abutment 42 during such rotation. The placement of the leading abutment 41 closest to the chuck body 11 allows the leading face 51 of the jaw 31 to be of short axial extent and to be connected to the forward end 46 through a sloped surface 52 extending therefrom toward the trailing side of the jaw 31. The sloping of the surface 52 reduces the probability and extent of damage to articles or persons coming in contact with the jaw 31 while it is being rotated and removes unnecessary weight from the jaw 31. The jaw 31 is preferably also sloped radially outwardly and axially rearwardly as indicated at 53 for similar reasons. In the particular embodiment shown, the circumferential width of the carrier-contacting surface 44 is of lesser width than the portion of the chuck jaw 31 thereabove to conform to the width of the jaw carrier 17.

The remaining jaw 32 differs from the afore-mentioned jaws 31 primarily in the axial extent of the abutments thereof. Consequently parts of the jaw 32 will be referred to by the same reference numerals designated corresponding parts of the jaw 31 but with the suffix "a" added thereto. The abutment 41a is substantially identical to the abutment 41 of the jaw 31 but is preferably of greater axial extent. The abutment 42a is similar to the abutment 42 of the jaw 31 but is extended rearwardly preferably to the carrier contact surface 44 but at least into circumferential opposition with the abutment 41a. Thus, a cylindrical workpiece will be gripped by the surface 49a of the abutment 42a substantially throughout the axial length of the jaw 32 and will also be contacted by the circumferentially opposed surface 48a of the abutment 41a.

The jaws 31 and 32 are preferably arranged on the chuck 10 so that the abutment 41a and the two abutments 41 are, respectively, located between the abutment 42a and the two abutments 42 around the circumference of the workpiece.

Operation

Rearward motion of the drawbar bolt 22 produces in a known manner a simultaneous radially inward motion of the jaw carriers 17 and thus moves the jaws 31 and 32 inwardly toward the workpiece W. The workpiece W may be initially positioned somewhat eccentrically of the axis of the chuck 10 as long as said workpiece W is between the jaws 31 and 32. For purposes of convenience in discussion only, the workpiece W will be considered generally cylindrical. It will be noted, however, that axially extended workpieces of other configuration may be held and that the chuck construction 10 is not limited to cylindrical workpieces.

Continued inward movement of the jaws 31 and 32 causes the abutments 41, 42 and 41a, 42a thereof to contact the periphery of the workpiece W. One abutment of each jaw may contact the workpiece W before the other abutment thereof as said jaws are moved inwardly. As a result, each such jaw will pivot about the axis of the bolt 38 as the jaw carrier 17 is moved inwardly to bring both of the abutments thereof into firm contact with the workpiece W. With the workpiece W firmly held by the jaws 31 and 32 it will be noted that the circumferential and axial spacing of the abutments 41 and 42 allows the jaws 31 to each firmly engage the workpiece W at a pair of axially and circumferentially spaced locations thereon despite surface irregularities or contours thereof. On the other hand, the jaw 32 supports the workpiece substantially continuously along a large axial extent thereof as long as the workpiece is substantially cylindrical.

Rotation of the chuck 10 and, hence, the workpiece W and application of any suitable tool to the workpiece W forwardly of the jaws 31 and 32 will apply a torque to said workpiece W between the tool and the jaws 31 and 32.

The relatively short distance between the leading abutment 41 and the pivot axis of the jaws 31 as compared to the relatively longer distance between the trailing abutment 42 and said pivot axis improves the tendency of the abutment 41 to increase its gripping force on the workpiece W in response to such a torque thereupon. Such increase in gripping force is somewhat greater than would be the case in a corresponding jaw construction having workpiece gripping surfaces equally spaced from the pivot axis of the jaw and having a spread therebetween similar to the abutments 41 and 42.

*Modification*

When a workpiece deviating widely from a cylindrical configuration is to be chucked, such workpiece being tapered, stepped or otherwise varying in cross section through its length, replacement of the jaw 32 with a third jaw 31 may be desired, so that three identical jaws 31 are used. In such cases the abutments 41 and 42 of all of the jaws will be capable of firmly engaging the workpiece at axially displaced portions thereon, even when said portions have radially differing cross-sectional shapes and sizes, for positively gripping said workpiece in said chuck. It has been found so far that workpieces having an axis along which they are elongated can be chucked by the jaws 31 with such axis at least parallel to and closely spaced from the chuck axis. Usually, as when the gripped portions are substantially circular or have other cross-sectional shapes generally considered compatible with a three-jaw chuck, the three jaws 31 will maintain the workpiece coaxial of the chuck 10. Moreover, workpieces including portions having parallel axes will generally be chucked with such axes parallel to the rotational axis of the chuck.

The difference in cross-sectional size of the portions gripped by the abutments 41 and 42 which will be tolerated by a given set of jaws will be limited by contact between the workpiece and the face 43. Thus, it may in some cases be desired to extend the abutments 41 and 42 further from the face 43 in particular cases than is here shown. Further, it will be noted that the particular jaw construction 31 shown is readily adapted to gripping more pieces having a large diameter portion adjacent the face of the chuck body 11 and a smaller portion spaced forwardly therefrom since the forward abutment 42 extends further from the face 43 than does the abutment 41. However, it is fully contemplated that for a tapered or stepped piece having a relatively small diameter rearward end and a relatively large diameter forward end that the abutment 41 may be extended outwardly from the face 43 further than the abutment 42. As an alternative, the leading abutment 41 may be moved forwardly on the face 43 and the trailing abutment 42 may be moved rearwardly thereon if the jaw 31 is to be maintained in substantially radial alignment on the forward face of the chuck 10.

Although particular preferred embodiments of the invention have been disclosed above for illustrative purposes, it will be understood that variations or modifications thereof which lie within the scope of the appended claims are fully contemplated.

What is claimed is:

1. A chuck construction capable of gripping axially spaced zones on an elongated irregular workpiece, comprising in combination:
    a chuck including a plurality of jaw carriers and means for moving said jaw carriers toward and away from each other for gripping a workpiece;
    a plurality of axially elongated jaws and means for pivotally mounting said jaws on said jaw carriers, each of said jaws having only a pair of raised abutments fixed thereto and extending substantially inwardly therefrom, said abutments being spaced from each other circumferentially of said chuck, said pair of abutments on at least some of said jaws also being spaced from each other axially of said chuck;
    whereby a workpiece having a rough or contoured surface will be securely gripped by said jaws upon movement of said jaw carriers toward said workpiece.

2. The device defined in claim 1 wherein portions of said abutments on one of said jaws are circumferentially opposed for gripping a common circumferential zone of a workpiece; and
    said abutments on all but said one of said jaws are spaced axially of each other.

3. The device defined in claim 1 wherein:
    said circumferentially spaced pair of abutments on all of said jaws are spaced axially of each other whereby to enable firm gripping thereby of a stepped workpiece.

4. The device defined in claim 1 wherein said abutments on a jaw extend different distances away from the pivot axis of said jaw and wherein said distances are the same on all of said jaws.

5. The device defined in claim 4 wherein:
    the one of said abutments on each jaw which leads during rotation of the chuck extends less far from the pivot axis of said jaw than does the other trailing one of said abutments on said jaw;
    so that said jaws grip said workpiece more firmly in response to increased torques exerted on said workpiece.

6. The device defined in claim 1 wherein the surface of said jaws furthest from said chuck is sloped axially toward said chuck from the one of said abutments which trails during normal rotation of said chuck to the other leading one of said abutments, said leading abutment extending less far from said chuck than said trailing abutment;
    so that the rotating jaws can move more easily past interferring objects in their path.

7. A chuck jaw construction for engaging a workpiece to be held in a chuck, comprising in combination:
    a generally rectangular body having a surface opposed to said workpiece and generally parallel to the rotational axis of said chuck;
    a pair of abutments fixed to and extending out of said surface, said pair of abutments being spaced from each other and located adjacent diagonally opposite corners of said face, the remaining corners of said face being free of such abutments said abutments extending from said face at different distances and having sloped surfaces thereon for gripping said workpiece;
    means for pivotally securing said jaw to said chuck and means for moving said jaw on said chuck and into contact with said workpiece.

8. In a chuck construction for engaging a workpiece, the combination comprising:
    a chuck;
    a plurality of jaws pivotally mounted with respect to said chuck and capable of converging movement to engage said workpiece;
    at least two work-engaging surfaces fixed on each of said jaws, at least one of the work-engaging surfaces on each of certain jaws being axially and circumferentially offset with respect to the other work-engaging surfaces on said each of said certain jaws, the portions of said certain of said jaws disposed axially of said work-engaging surfaces, by reference to said chuck, being depressed with respect to said work-engaging surfaces, whereby said workpiece will be firmly gripped by said work-engaging surfaces despite irregularities in shape thereof.

9. In a chuck construction for gripping axially spaced zones on an irregular workpiece and including a plurality of radially reciprocable jaw carriers and a jaw mounted on each of said jaw carriers for pivotal movement about an axis parallel to the chuck axis and for engaging the workpiece, each of said jaws having a surface opposed to the workpiece, the improvement comprising:

first and second toothed work-engaging elements fixed on said surface of each of said jaws, said first and second elements being axially and circumferentially offset from each other, the remainder of said surface of said jaws aligned circumferentially of the chuck with said first element being depressed with respect to said second element and the remainder of said surface aligned circumferentially of the chuck with said second element being depressed with respect to said first element so that a workpiece can be gripped at axially spaced zones thereon by said first and second elements of each of said jaws.

References Cited by the Examiner

UNITED STATES PATENTS

| | | | |
|---|---|---|---|
| 1,059,545 | 4/1913 | Kunze | 279—123 |
| 2,815,959 | 12/1957 | Vandenberg | 279—123 |
| 3,099,457 | 7/1963 | Hohwart | 279—123 |

ROBERT C. RIORDON, *Primary Examiner.*

H. V. STAHLHUTH, *Assistant Examiner.*